INVENTOR
A. L. DE BURRO
BY R. B. Ardis
ATTORNEY

Dec. 19, 1967 A. L. DE BURRO 3,359,372

PCM TELEPHONE SIGNALING WITH TIME-DIVIDED SIGNALING DIGIT SPACES

Filed May 24, 1966 3 Sheets-Sheet 2

Dec. 19, 1967 A. L. DE BURRO 3,359,372

PCM TELEPHONE SIGNALING WITH TIME-DIVIDED SIGNALING DIGIT SPACES

Filed May 24, 1966 3 Sheets-Sheet 3

United States Patent Office 3,359,372
Patented Dec. 19, 1967

3,359,372

PCM TELEPHONE SIGNALING WITH TIME-DIVIDED SIGNALING DIGIT SPACES

Agostino L. De Burro, Atkinson, N.H., assignor to Bell Telephone Laboratories, Incorporated, Berkeley Heights, N.J., a corporation of New York Filed May 24, 1966, Ser. No. 552,518
7 Claims. (Cl. 179—15)

This invention relates generally to pulse type communication systems and more particularly to time division multiplex pulse code modulation systems which transmit a framing pattern consisting of alternate binary "1" and binary "0" in successive framing digit spaces.

When a number of metallic voice-frequency telephone transmission lines are replaced by a single multichannel carrier trunk, each carrier channel must, if it is to be fully compatible with the associated central office switching equipment, be capable not only of carrying the same message information as the voice pair it replaces but also of passing the same telephone signaling information. It should, in other words, accept both voice messages and signaling information in the form they would have if they were to be impressed upon a metallic pair and should reproduce both in substantially their original form at the other end of the trunk. Signaling information in a carrier telephone system generally takes the form of two or more states per channel at each terminal which either describe the condition of a channel at that terminal or control the response with respect to the channel of associated equipment at the opposite terminal. Typical signaling states to be transmitted include open-loop, closed-loop, normal battery, reverse battery, and low frequency ringing.

In the past, when transmission of only two signaling states per channel has been necessary, an effective technique has been to add a signaling space, exclusive of the message digit spaces, to each of the message code groups and transmit either binary "1" or binary "0" in the signaling digit space. When transmission of three signaling states per channel has been necessary, a useful approach has been to borrow the least significant message digit space from each message code group during idle channel conditions and transmit either binary "1" or binary "0" in that digit space. Both techniques are illustrated in U.S. Patent 3,083,267, which issued Mar. 26, 1963, to D. C. Weller, in U. S. Patent 3,030,448, which issued Apr. 17, 1962, to D. J. Leonard and R. H. Shennum, and in copending application Ser. No. 418,212, which was filed Dec. 14, 1964, by G. W. Kinder and A. C. Longton.

Borrowing the least significant message digit space to transmit a third signaling state, however, has a number of inherent disadvantages. It does not, for example, permit the transmission of a fourth signaling state. In addition, it degrades message transmission for certain service type calls because the full number of message digit spaces is not available for message transmission under idle channel conditions and it requires relatively complex interlock circuits to be employed to permit other transmitting and receiving equipment to determine when the least significant message digit space is being used for signaling rather than for message transmission. Simple time division of the signaling digit space to permit transmission of a greater number of signaling states per channel would be possible, but such an approach would permit generation of an alternating binary "1" and binary "0" pattern in successive frames which could be interpreted as being the framing pattern. In a typical system, a framing digit space is added to each complete frame of successive message code groups and their signaling digit spaces and alternate binary "1" and binary "0" are transmitted in successive framing digit spaces. Any alternate binary "1" and binary "0" pattern at the frame rate in signaling digit spaces is indistinguishable from such a framing pattern and would, therefore, constitute a false framing pattern.

One object of the invention is to increase the number of signaling states which can be transmitted per channel in a time division multiplex pulse code modulation system without degrading the quality of message transmission under any conditions of operation.

Another object is to increase the number of signaling states which can be transmitted per channel without requiring complex interlock circuits to distinguish between message transmission and signaling.

Still another object of the invention is to time divide the signaling digit space in a time division multiplex pulse code modulation system without permitting the signaling digits to generate a false framing pattern.

In accordance with the present invention in its broader aspects, as many as four signaling states per channel may be transmitted in a time division multiplex pulse code modulation system by forcing two digits in the signaling digit space for each channel in each four successive frames to prevent appearance of an alternate binary "1" and binary "0" pattern at the framing rate, and by transmitting combinations of binary "1" and binary "0" in the remaining two signaling digit spaces for each channel in the same four successive frames to represent the signaling states. Forcing in this sense, means transmitting predetermined binary indications in the designated signaling digit spaces. In this manner, the signaling states are effectively transmitted with no degradation of message quality and with no requirement for complex interlock circuits, and the two forced digits provide effective insurance against appearance of a false framing pattern.

More particularly, in accordance with the invention, the alternate binary "1" and binary "0" framing pattern is prevented from appearing in the signaling digit spaces by forcing alternate binary "1" and binary "0" in successive digit signaling spaces for each channel in frames of like odd or even parity. Alternate binary "1" and binary "0" are forced, in other words, in successive signaling digit spaces for each channel in either odd frames or even frames. Up to four different signaling states per channel may then be transmitted by transmitting different combinations of binary "1" and binary "0" in the remaining signaling digit spaces. No matter what the transmitted signaling state, however, the forced alternate binary "1" and binary "0" in the signaling digit spaces for each channel in frames of like parity effectively prevents appearance of a false framing pattern.

A more complete understanding of the invention may be obtained by a study of the following detailed description of a specific embodiment. In the drawings.

Figure 1:
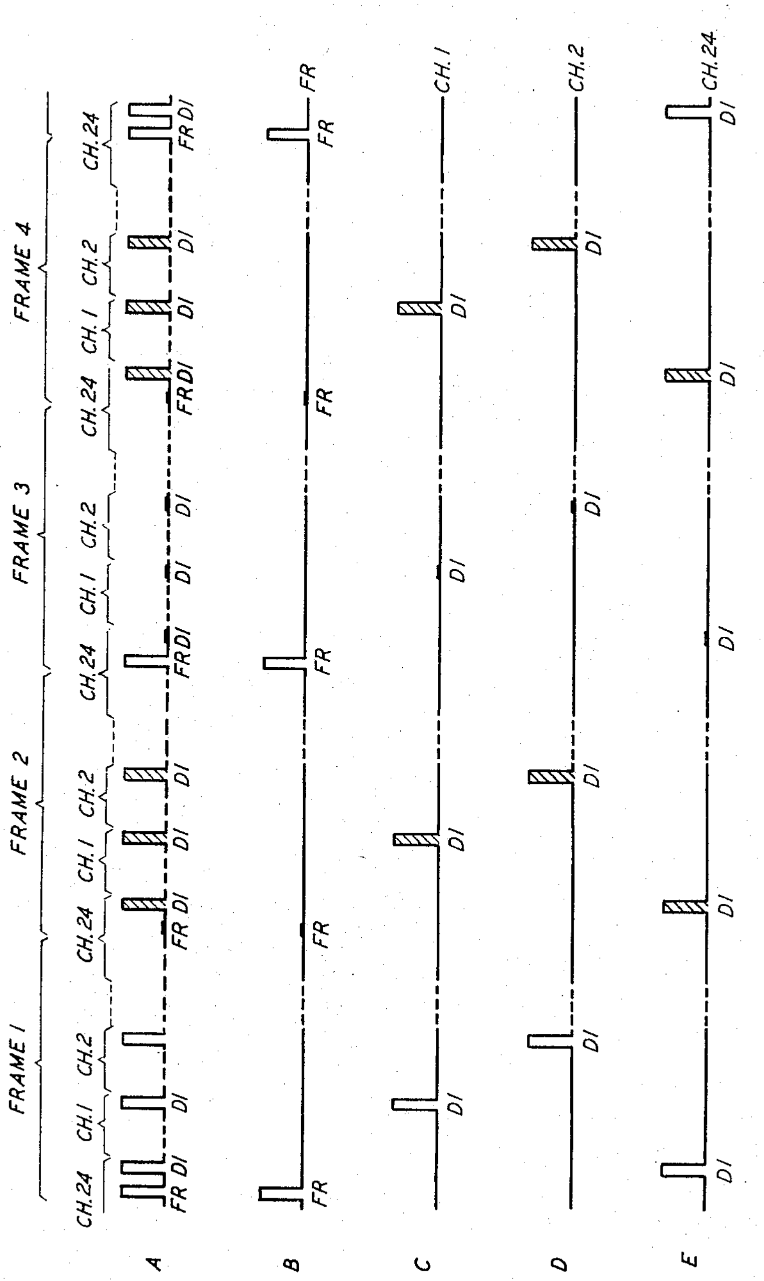
FIG. 1 illustrates the manner in which forcing alternate binary "1" and binary "0" in successive signaling digit spaces for each channel in odd numbered frames prevents appearance of a false framing pattern.

In FIG. 1, line A illustrates a portion of the digit or bit stream transmitted by a twenty-four channel pulse code modulation system embodying the invention. For simplicity, only the framing digits and the signaling digits of channels 1, 2 and 24 are shown for four successive frames. Each digit space containing binary "1" is represented by a plain pulse, each digit space containing binary "0" is represented by the absence of a pulse, and each digit space which may contain either binary "1" or binary "0," depending upon the signaling intelligence to be transmitted, is represented by a cross-hatched pulse.

In the particular example illustrated in line A of FIG. 1, the first digit space in each frame is the framing digit space FR. The next digit space is the signaling digit space D1 of the last channel of the immediately preceding frame. From that point on, the next eight digit spaces are the message and signaling digit spaces of channel 1, the next eight digit spaces are the message and signaling digit spaces of channel 2, and so on. In each channel but the last, the first seven digit spaces D2 through D8 are the message digit spaces and the last digit space D1 is the signaling digit space. In the last channel of each frame, the framing digit space FR intervenes between the message digit spaces and the signaling digit space. In all channels, the message digit spaces occur in order of decreasing mathematical significance. The contents of the framing digit spaces FR in line A of FIG. 1 are illustrated separately in line B. As shown, an alternate binary "1" and binary "0" framing pattern is transmitted in successive framing digit spaces. In a pulse code modulation system having a frame rate of 8 kHz., such as the Bell System's T1 carrier telephone system, such a framing pattern is thus a steady 4 kHz. code.

The respective contents of four successive signaling digit spaces D1 for channels 1, 2 and 24 are shown in lines C, D and E of FIG. 1. As shown, binary "1" is forced in the first of the four frames and binary "0" is forced in the third. In the second and fourth frames, up to four different combinations of binary "1" and binary "0" may be transmitted to represent an equal number of signaling states. Because the alternate binary "1" and binary "0" is forced during the odd numbered frames however, it is impossible for a false 4 kHz. framing code to appear in the signaling digit spaces D1 of any of the twenty-four channels, no matter what signaling state combinations are transmitted during the even numbered frames. In each group of four successive frames, the binary "1" forced in each channel immediately after the framing pulse serves additionally as an address digit, enabling the receiving circuitry to separate out the forced digits from the bit stream and accurately decode the received signaling information for each channel.

Figure 2:
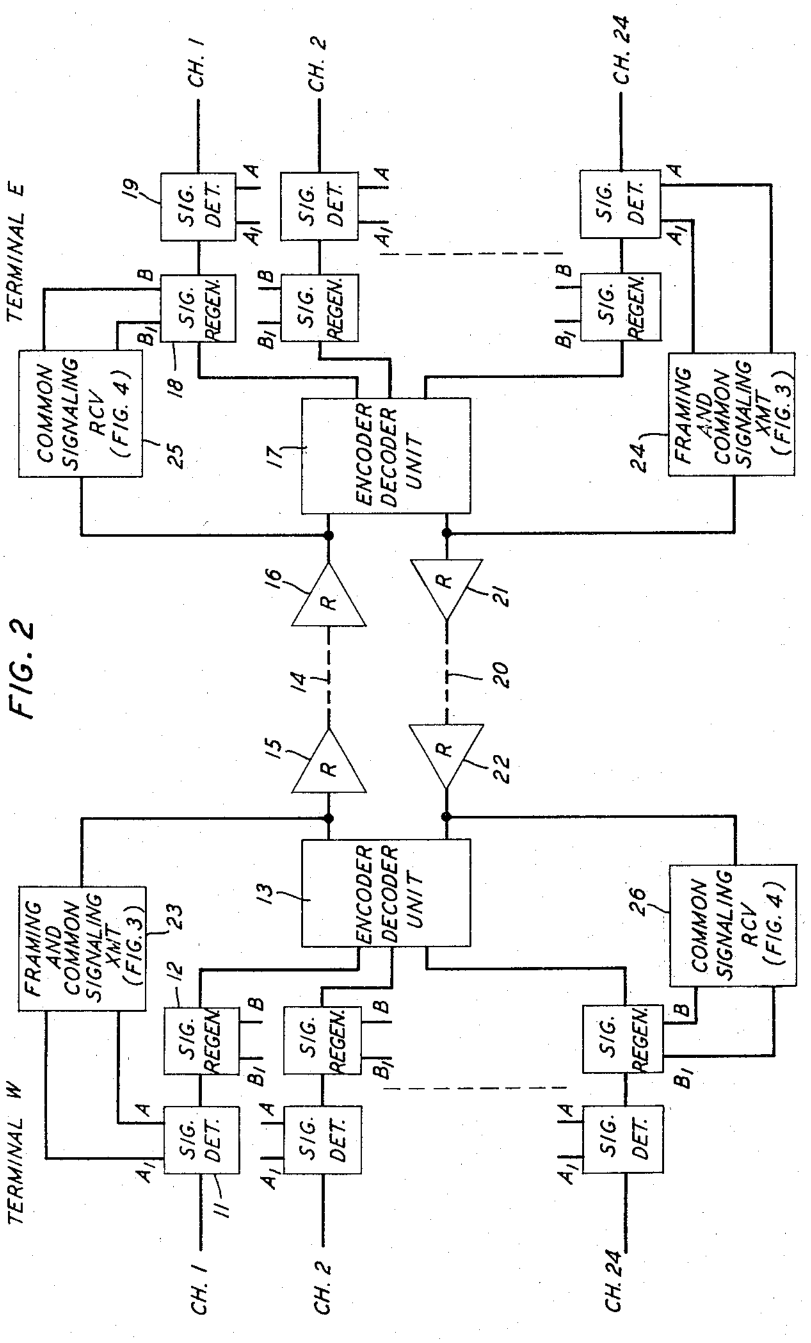
FIG. 2 is a block diagram of a multichannel pulse code modulation system embodying the invention.

The twenty-four channel pulse code modulation system illustrated in FIG. 2 may be used to replace twenty-four metallic voice-frequency lines between a pair of telephone central offices or between a telephone central office and a private branch exchange. In the example shown, every channel terminates in a two-way voice-frequency line at each central office, where it is connected to the usual central office switching equipment and, in addition to complex voice-frequency message waves, must carry one or more of the usual signaling states such as open-loop, closed-loop, normal battery, reverse battery, and low frequency ringing.

At the left-hand side of FIG. 2, the voice-frequency line of channel 1 in terminal W is connected through a signaling detector 11 and a signaling regenerator 12 to a pulse code modulation encoder-decoder unit 13. Signaling detector 11 and signaling regenerator 12 are shown in separate boxes for clarity, but may take the general form of the composite signaling detectors and regenerators shown in the above-identified Weller and Leonard-Shennum patents and Kinder-Longton application. In general, signaling detector 11 is sensitive to the signaling state applied to the channel by the associated central office switching equipment and converts the detected signaling state to digital form on output leads $A_1$ and A. Since there are two output leads, as many as four different signaling states can be represented by different combinations of binary "1" and binary "0" appearing on them. As shown in the above-identified references, the digital output representing the signaling state of channel 1 appears once each frame on leads $A_1$ and A during the time allotted to that particular channel. Signaling regenerator 12, on the other hand, is sensitive to different combinations of binary "1" and binary "0" on its two input leads $B_1$ and B and, with relays, converts them to corresponding signaling states for application to the associated central office switching equipment. As shown in the above-identified references, the digital input representing the signaling state of channel 1 appears once each frame on leads $B_1$ and B during the time allotted to that particular channel. Encoder-decoder unit 13 includes a suitable hybrid network for each channel to separate the two directions of transmission into transmitting and receiving paths, a sampling gate for each channel to interleave samples from successive channels in time division multiplex, and a pulse code modulation encoder in the common transmitting path, a pulse code modulation decoder in the common receiving path, and a distributing gate and a low-pass filter for each channel to reconstruct the original voice-frequency message waves in analog form. Typical examples are shown in the above-identified patents and copending application.

From encoder-decoder unit 13 in FIG. 2, the encoded digit or bit stream is transmitted over a transmission line 14, which has regenerative pulse repeaters such as repeaters 15 and 16 spaced at regular intervals throughout its length, to terminal E. Encoder-decoder unit 17, which is similar to encoder-decoder unit 13 in terminal W, restores the incoming message code groups to analog form and distributes them to the proper channels. As illustrated, encoder-decoder unit 17 is connected to channel 1 through a signaling regenerator 18 and signaling detector 19. These are like signaling regenerator 12 and signaling detector 11, respectively, at the other end of the line in terminal W.

The remaining channels in the twenty-four channel pulse code modulation system shown in FIG. 2 are like channel 1 in all respects and need not be individually described. For transmission from encoder-decoder unit 17 in terminal E to encoder-decoder unit 13 in terminal W, a transmission line 20, which has regenerative pulse repeaters such as repeaters 21 and 22 spaced at regular intervals throughout its length, is connected in the opposite direction from transmission line 14 in the manner illustrated.

The portion of the pulse code modulation system illustrated in FIG. 2 which has thus far been described is conventional and serves to transmit encoded voice-frequency message waves in both directions between terminals W and E. To insert framing and encoded signaling information into the transmitted digit or bit stream in accordance with the present invention and as shown in line A of FIG. 1, a framing and common signaling transmitting unit 23 is connected to the input end of repeatered transmission line 14 at the encoder output of encoder-decoder unit 13 at terminal W. To perform the same function in the opposite direction a similar framing and common signaling transmitting unit 24 is connected to the input end of repeatered transmission line 20 at the encoder output of encoder-decoder unit 17 at terminal E. Each framing and common signaling transmitting unit is connected to the $A_1$ and A digital output leads of all of the channel signaling detectors at its respective terminal. To recover signaling information from the received digit stream at terminal E, a common signaling receiving unit 25 is connected to the output end of transmission line 14 at the decoder input of encoder-decoder unit 17. At terminal W, a similar common signaling receiving unit 26 is connected to the output end of transmission line 20 at the decoder input of encoder-decoder unit 13. Each common signaling receiving unit is connected to the $B_1$ and B digital input leads of all of the channel signaling regenerators at its respective terminal. Although it is not shown separately in FIG. 2, it is understood that each terminal incorporates conventional framing circuitry for recovering the alternate binary "1" and binary "0" framing code transmitted in the FR digit spaces and keeping the receiving terminal in synchronism with the transmitting terminal.

Figure 3:
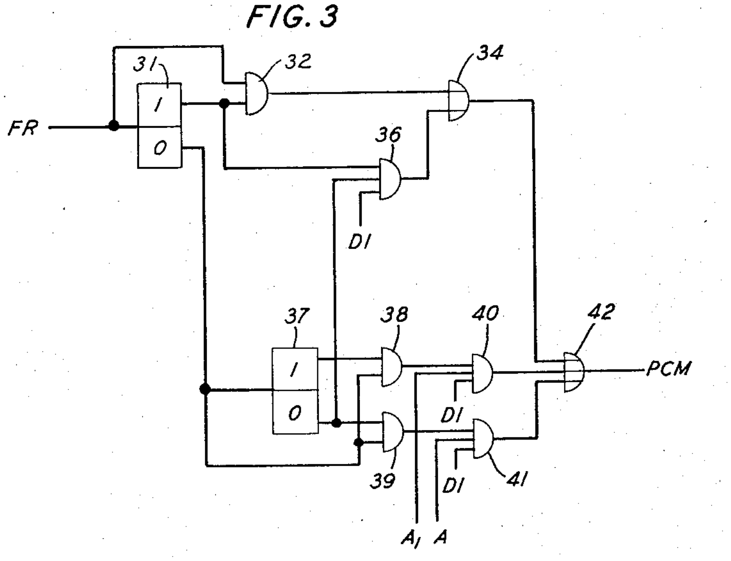
FIG. 3 illustrates logic circuitry which may be employed at each transmitter in the embodiment of the invention illustrated in FIG. 2 to generate the required signaling digit pattern.

FIG. 3 is a block diagram of a simplified logic circuit which may, in accordance with the invention, be used as framing and common signaling transmitting units 23 and 24 in FIG. 2. For convenience, positive-going pulses are assumed throughout. Thus, each binary "1" is a positive pulse and each binary "0" is no pulse at all. In addition, each binary counter is triggered to the state illustrated by the first positive pulse at its input.

At the left in FIG. 3, the input to a binary counter 31 is supplied with pulses at the framing rate from a suitable source, i.e., one pulse during each framing digit space FR. As indicated by the conventional symbol, binary counter 31 has a single input and two outputs. The upper output, labeled "1," is switched to a positive voltage by the first input pulse, while the lower output, labeled "0," is switched to zero voltage. These states are reversed by each succeeding input pulse. Over a period of four successive frames, output "1" of binary counter 31 thus bears the waveform $F_1$ $F_0$ $F_1$ $F_0$, where $F_1$ is a positive voltage which lasts for a full frame and $F_0$ is zero voltage also lasting for a full frame. Over the same four successive frames, output "0" of binary counter 31 bears the waveform $F_0$ $F_1$ $F_0$ $F_1$.

To generate an alternating binary "1" and binary "0" framing pattern in the framing digit space FR, output "1" of binary counter 31 and the framing pulse source are connected to respective inputs of an AND gate 32. The ouput of AND gate 32, which bears the framing pattern to be transmitted, is connected to one input of an OR gate 34.

In addition to being supplied to AND gate 32, the waveform from the "1" output of binary counter 31 is also supplied to one input of an AND gate 36. The waveform from the "0" output, on the other hand, is supplied to the input of a second binary counter 37 and to one input each of a pair of AND gates 38 and 39.

Output "1" of binary counter 37 bears the waveform $F_0$ $F_1$ $F_1$ $F_0$ over four successive frames and is connected to the remaining input of AND gate 38. Since the other input of AND gate 38 is, as described above, supplied with the waveform $F_0$ $F_1$ $F_0$ $F_1$ from binary counter 31, the output of AND gate 38 is the waveform $F_0$ $F_1$ $F_0$ $F_0$. The output of AND gate 38 is thus positive only during the second of the group of four successive frames and is supplied to an AND gate 40 to control the transmission of the signaling information on the $A_1$ input lead of the framing and common signaling transmitting unit.

Similarly, output "0" of binary counter 37 bears the waveform $F_1$ $F_0$ $F_0$ $F_1$ over four successive frames and is connected to the remaining input of AND gate 39. Since the other input of the latter is, as described above, supplied with the waveform $F_0$ $F_1$ $F_0$ $F_1$ from binary counter 31, the output of AND gate 39 is the waveform $F_0$ $F_0$ $F_0$ $F_1$. The output of AND gate 39 is thus positive only during the fourth of the group of four successive frames and is supplied to an AND gate 41 to control the transmission of the signaling information on the A input lead of the framing and common signaling transmitting unit.

The $A_1$ input lead of the framing and common signaling transmitting unit in FIG. 3 carries either binary "1" or binary "0" during the time each channel is being sampled by its respective signaling detector in FIG. 2 and is connected to a second input of AND gate 40. The A input lead also carries either binary "1" or binary "0" during the time each channel is being sampled and is connected to a second input of AND gate 41. Third inputs of AND gates 40 and 41 are both supplied with positive going pulses in the signaling digit space D1 of each channel. The waveforms supplied to AND gates 40 and 41 from AND gates 38 and 39 thus serve to confine the digital information on input leads $A_1$ and A to the second and fourth frames, respectively, of each group of four successive frames and the pulses received in the signaling digit space D1 serve to concentrate that information further into the signaling digit spaces of the respective channels. The outputs of AND gates 40 and 41 are connected to two inputs of an OR gate 42 for application to the outgoing encoded digit or bit stream from the pulse code modulation encoder. In this manner, as many as four signaling states per channel may be transmitted to the receiving terminal at the opposite end of the line. The framing pattern is added to the bit stream by a connection of the output of OR gate 34 to still another input of OR gate 42.

In accordance with a feature of the invention, AND gate 36 cooperates with AND gates 40 and 41 to force the presence of binary "1" in the signaling digit space D1 of each channel during the first frame and to force the presence of binary "0" in that digit space during the third frame, thereby preventing appearance of a false alternate binary "1" and binary "0" pattern at the framing rate and providing address digits to be used at the receiving terminal. AND gate 36 receives waveform $F_1$ $F_0$ $F_1$ $F_0$ from binary counter 31, waveform $F_1$ $F_0$ $F_0$ $F_1$ from binary counter 37, and a positive-going pulse during each signaling digit space D1. AND gate 36, therefore, has binary "1," a positive-going pulse, at its output only during the signaling digit spaces of the first frame of each group of four. These pulses are supplied, as illustrated in FIG. 3, to a second input of OR gate 34. From OR gate 34, they are supplied, along with the framing digit pattern, to OR gate 42 for insertion in the transmitted digit or bit stream, thereby forcing the presence of binary "1" in the signaling digit spaces for each channel in the first frame of each group of four successive frames. The first binary "1" in a signaling digit space D1 in the first frame serves as an address digit to control decoding of all signaling information at the receiving terminal. The presence of binary "0" is forced in the signaling digit spaces for each channel in the third frame of the same group of four by reason of the blocking action afforded during that frame by AND gates 36, 40, and 41.

Figure 4:
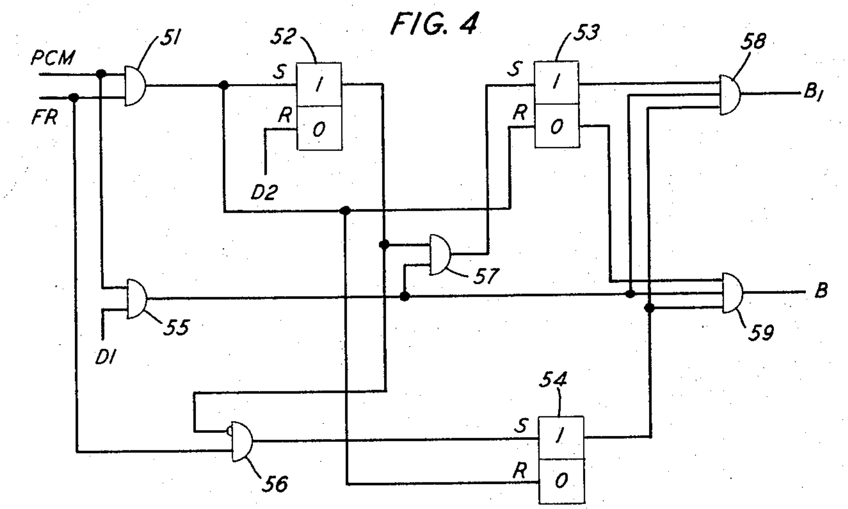
FIG. 4 illustrates logic circuitry which may be employed at each receiver in the embodiment of the invention illustrated in FIG. 2 to decode the transmitted signaling information.

FIG. 4 is a block diagram of a simplified logic circuit which may, in accordance with the invention, be used as common signaling receiving units 25 and 26 in FIG. 2. As in FIG. 3, positive going pulses are assumed throughout. In addition, each flip-flop or bistable multivibrator is triggered to the state illustrated by the first positive pulse at its S or set input.

At the upper left in FIG. 4, the incoming digit or bit stream is received on the line labeled PCM and a local pulse generator, operating at the framing rate, supplies a pulse during each framing digit space on the line labeled FR. Both the incoming bit stream and the locally generated framing pulse are supplied to respective inputs of an AND gate 51, causing the alternate binary "1" and binary "0" framing pattern to appear at its output. The output of AND gate 51 is connected to the S or set input of a flip-flop or bistable multivibrator 52, the R or reset input of a flip-flop or bistable multivibrator 53, and the R or reset input of a flip-flop or bistable multivibrator 54. At the same time, the incoming bit stream is supplied to one input of an AND gate 55 and the locally generated framing pulses FR are supplied to the input of an INHIBIT gate 56. In the latter, the conventional symbol used in FIG. 4 shows the inhibit input as that leading to the smaller of the two semicircles.

To recover the signaling digits for all channels and all frames from the incoming bit stream, a pulse is supplied to the remaining input of AND gate 55 during each signaling digit space D1. The recovered signaling digits, which include not only those representing true signaling information but also the digits forced, in accordance with the invention, during the first and third of each group of four successive frames are then supplied to one input of an AND gate 57 and to one input each of a pair of AND gates 58 and 59.

A waveform for controlling the separation from the incoming bit stream not only of the address digits forced during the first of each group of four successive frames but also of the digits representing signaling information is generated at the upper or "1" output of flip-flop 52. As explained previously, the set input of flip-flop 52 is supplied with alternate binary "1" and binary "0" in successive frames during the framing digit space FR. The "1" output of flip-flop 52 is switched to a positive voltage by a pulse at the set input and back to zero voltage by a pulse at the reset input. The "0" output, although not used, is opposite in phase from the "1" output and is switched to zero voltage by the pulse at the set input and to a positive voltage by the pulse at the reset input. The output of flip-flop 52 is thus set to a positive voltage at the beginning of each odd-numbered frame. To return the output of flip-flop 52 to zero voltage two digit spaces later, the reset input is supplied with pulses at the channel rate during every digit space D2 immediately following a signaling digit space D1. The resulting waveform is supplied to one input of AND gate 57 and to the inhibit input of INHIBIT gate 56.

The address digit, the first forced binary "1" in the signaling digit space D1 in the first of each group of four frames, is separated from the bit stream by AND gate 57. The input to AND gate 57 received from AND gate 55 is positive during the signaling digit space D1 of each channel during the first frame, but the input received from flip-flop 52 is positive only for the two digit spaces immediately following the framing digit in that frame. Only the address digit D1 thus appears at the output of AND gate 57. This digit is, in turn, supplied to the set input of flip-flop 53.

INHIBIT gate 56 functions to produce a pattern of alternate binary "1" and binary "0" in the framing digit space FR opposite in phase from the one appearing at the output of AND gate 51. Pulses appear at the non-inhibit input of INHIBIT gate 56 during every framing digit space but those appearing during odd-numbered frames are inhibited by the waveform from flip-flop 52 applied to the inhibit input. The resulting pattern of alternate binary "1" and binary "0" is applied to the set input of flip-flop 54.

Flip-flops 53 and 54 in FIG. 4 generate controlling waveforms for the final separation of signaling information from the received bit stream. Flip-flop 53 is set to the state illustrated by the address digit D1 applied from AND gate 57 at the beginning of the first frame of each group of four and is reset to the opposite state by the framing pulse applied from AND gate 51 at the beginning of the third frame. The waveform at output "1" of flip-flop 53 thus takes the form $F_1$ $F_1$ $F_0$ $F_0$ and is applied to AND gate 58. The waveform at output "0" of flip-flop 53, on the other hand, takes the form $F_0$ $F_0$ $F_1$ $F_1$ and is applied to AND gate 59. Flip-flop 54 is set to the state illustrated by the pulse received from INHIBIT gate 56 at the beginning of each even-numbered frame and is reset to the opposite state by the pulse received from AND gate 51 at the beginning of each odd-numbered frame. The waveform appearing at output "1" of flip-flop 54 thus takes the form $F_0$ $F_1$ $F_0$ $F_1$.

The final separation of signaling information for application to the $B_1$ and B inputs of thet signaling regenerators of the receiving terminal is performed by AND gates 58 and 59. AND gate 58 is controlled by the waveforms $F_1$ $F_1$ $F_0$ $F_0$ and $F_0$ $F_1$ $F_0$ $F_1$ and therefore passes signaling digits from AND gate 55 only during the second frame of each group of four. These signaling digits represent true signaling information, i.e., the state of output lead $A_1$ for each signaling detector at the transmitting terminal. AND gate 59, on the other hand, is controlled by the waveforms $F_0$ $F_0$ $F_1$ $F_1$ and $F_0$ $F_1$ $F_0$ $F_1$ and passes signaling digits from AND gate 55 only during the fourth frame. These signaling digits also represent true signaling information, i.e., the state of output Lead A for each signaling detector at the transmitting terminal. The outputs from AND gates 58 and 59 are applied to the $B_1$ and B inputs, respectively, of each signaling regenerator at the receiving terminal. As explained in connection with FIG. 1, each signaling regenerator serves to convert the received digital signaling information into the correct D-C signaling state for its respective channel.

It is to be understood that the above-described arrangements are illustrative of the application of the principles of the invention. Numerous other arrangements may be devised by those skilled in the art without departing from the spirit and scope of the invention.

What is claimed is:

1. In a multichannel pulse code modulation communication system, a transmitter for converting message samples from a plurality of incoming message channels into frames of successive binary code groups, each of said code groups having a predetermined number of message digit spaces each and each of said frames containing one code group from each of said channels, means for adding a framing digit space to each frame exclusive of said message digit spaces, means for transmitting alternate binary "1" and binary "0" in successive framing digit spaces, and signaling means for transmitting up to four non-message signaling conditions per channel without interferring with either message transmission or framing which comprises means for adding a signaling digit space to each code group exclusive of said message digit spaces, means for forcing two digits in the signaling digit spaces for each of said channels in each four successive frames to prevent appearance of the alternate binary "1" and binary "0" framing pattern in said signaling digit spaces, and means for transmitting combinations of binary "1" and binary "0" in the remaining two signaling digit spaces for each of said channels in said four successive frames to transmit said non-message signaling conditions.

2. A multichannel pulse code modulation communication system in accordance with claim 1 in which said alternate binary "1" and binary "0" framing pattern is prevented from appearing in said signaling digit spaces by forcing digits in successive signaling digit spaces for each of said channels in alternate frames.

3. A multichannel pulse code modulation communication system in accordance with claim 1 in which said alternate binary "1" and binary "0" framing pattern is prevented from appearing in said signaling digit spaces forcing alternate binary "1" and binary "0" in successive signaling digit spaces for each of said channels in alternate frames.

4. A multichannel pulse code modulation communication system in accordance with claim 1 in which said alternate binary "1" and binary "0" framing pattern is prevented from appearing in said signaling digit spaces forcing digits in successive signaling digit spaces for each of said channels in frames of like parity in groups of four successive frames.

5. A multichannel pulse code modulation communication system in accordance with claim 1 in which said alternate binary "1" and binary "0" framing pattern is prevented from appearing in said signaling digit spaces by forcing digits in successive signaling digit spaces for each of said channels in frames of odd parity in groups of four successive frames.

6. A multichannel pulse code modulation communication system in accordance with claim 1 in which said alternate binary "1" and binary "0" framing pattern is prevented from appearing in said signaling digit spaces by forcing alternate binary "1" and binary "0" in successive signaling digit spaces for each of said channels in frames of like parity in groups of four successive frames.

7. A multichannel pulse code modulation communication system in accordance with claim 1 in which said alternate binary "1" and binary "0" framing pattern is prevented from appearing in said signaling digit spaces by forcing alternate binary "1" and binary "0" in successive signaling digit spaces for each of said channels in frames of odd parity in groups of four successive frames.

References Cited

UNITED STATES PATENTS

| | | | |
|---|---|---|---|
| 3,166,734 | 1/1965 | Helfruh | 179—15 |
| 3,083,267 | 3/1963 | Weller | 179—15 |
| 3,030,448 | 4/1962 | Leonard et al. | 179—15 |

OTHER REFERENCES

Purton, "Experimental 24-channel P.C.M. System for Junction Circuits," A.T.E. Journal, vol. 20, No. 1, January 1964. Pages 17–31 relied on. Copies available in the Scientific Library.

ROBERT L. GRIFFIN, *Primary Examiner.*